2,918,402
BACTERICIDAL-FUNGICIDAL COMPOSITIONS

Jerome F. Fredrick, New York, N.Y., assignor to The Dodge Chemical Company, Boston, Mass., a corporation of Massachusetts No Drawing. Application July 29, 1958
Serial No. 751,637

10 Claims. (Cl. 167—33)

This invention relates to bactericidal-fungicidal compositions containing as active ingredients the quaternary ammonium alkyl derivatives of chlorokojic acid (2-chloromethyl-5-hydroxygamma pyrone) and certain related compounds, which are activated in the presence of metallic ions in water.

The use of quaternary ammonium compounds for purposes of disinfection is well known. However, such prior compounds have had the serious defect that they are inactivated by metallic ions encountered in various waters and biological fluids.

In a brief summary of this invention, it has now been found that a group of new quaternary ammonium compounds prepared by the reaction of chlorokojic acid and certain derivatives thereof with long alkyl tertiary amines derived from cocoanut fatty acids, and particularly the dialkyl derivatives of these amines having a minimum carbon chain of eight units and a maximum of eighteen units, are not adversely affected by metallic salts, and indeed are activated by contact with such inorganic materials so that an increase in their bactericidal and fungicidal properties occurs. These new compounds are defined by the structure

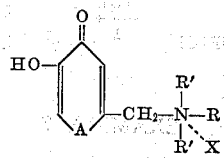

or

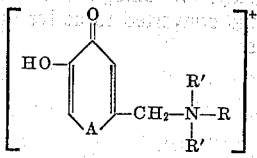

plus derivatives thereof, and more particularly by the structures

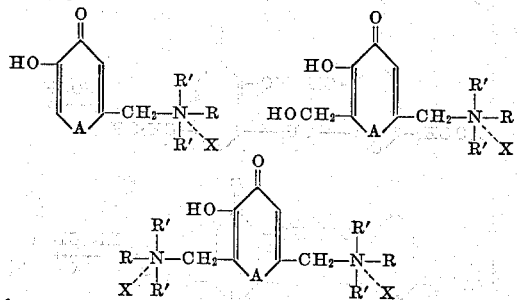

and

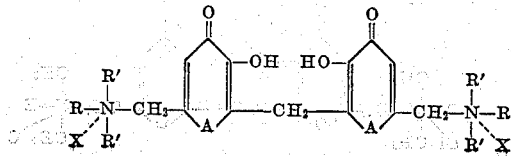

where A is O or NH; R is an aliphatic hydrocarbon having between 8 and 18 carbon atoms, preferably an even number and with no more than two double bonds; R' is a short aliphatic hydrocarbon; and X is an inert anion, preferably a halide or sulfate. Fungicidal and bactericidal compositions are prepared by mixing the above compounds with a carrier, for example from 0.1 to 1.0 percent by weight in water, with or without other additives, for application as disinfectants to plants and inanimate objects.

The new quaternary ammonium compounds can be prepared by refluxing chlorokojic acid, or one of its derivatives, dissolved in the tertiary amine, extracting the quaternary with warm water, filtering, and concentrating the filtrate to an active gel by evaporation.

This invention may be better understood by reference to the following examples.

EXAMPLE 1

1.5 parts by weight of chlorokojic acid were dissolved in 1.0 part of coco dimethyl tertiary amines and the mixture refluxed for one hour at 80° C. The mixture was then extracted with warm water at a temperature of 40° C., filtered, and the filtrate concentrated over a steam bath to a thick, brown gel. This gel, comprising about 86% quaternary ammonium derivatives of chlorokojic acid, was fungicidally and bactericidally active as illustrated below.

The structure of the active ingredients in these compositions as obtained from partition and electropotential studies is as follows:

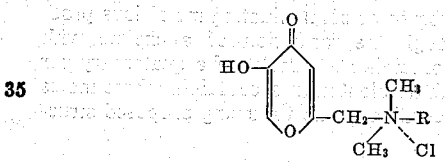

where "R" can be any and all of the following types of aliphatic hydrocarbons, and, according to this example, in the following proportions:

| Carbon chain length: | Portion by weight |
|---|---|
| Saturated— | |
| C–8 | 8 |
| C–10 | 7 |
| C–12 | 49 |
| C–14 | 17 |
| C–16 | 9 |
| C–18 | 2 |
| Unsaturated— | |
| C–18 (one double bond) | 6 (as oleic) |
| C–18 (two double bonds) | 2 (as linoleic) |

When the above gel is dissolved in water to give solutions, for example from 0.1 to 1.0% by weight active material, these solutions have biocidal properties with regard to bacteria and fungal spores. The solutions are also surface-active and are of cationic nature.

It has been further found that these disinfecting solutions are not adversely affected by water containing metal salts, but are instead activated in so far as the above-mentioned biocidal properties are concerned. Furthermore, waters up to and including 500 p.p.m. of hardness do not cause any decrease in this activity.

Test I

Fungicidal tests were made by the F.D.A. Agar Cup Method (U.S.D.A. Cir. 198, December 1931) using the spores only of a ten day culture of a mixed mold Mucor (A.T.C.C. 7927–1937), of which a 0.1 cc. suspension was used. This mold was treated with a 1% water solution of the gel in Example 1. The appearance of a clear zone surrounding the cup indicated that the invention was fungistatic and recultures from this zone indicated that it was fungicidal. 1% solutions of the above gel containing 1% ferric ion were similarly tested. The results of these tests are as follows:

MUCOR SPP. A.T.C.C. 7927-7937

| Agent | Width of Clear Zone, mm. | Reculture |
|---|---|---|
| Alone | 10 | Negative. |
| Plus Fe³ (1%) | 20 | Do. |

It should be noted that metallic ions such as iron activate both the fungistatic and fungicidal properties of the active compounds.

Test II

Bactericidal tests were made using the Phenol Coefficient Method (F.D.A., December 1931) with *Salmonella typhosa* (*E. typhosa*) Hopkins of 24 hour cultures with the following results:

*E. typhosa* HOPKINS

| Agent | Phenol Coefficient of 1% Solution |
|---|---|
| Alone | 25.0 |
| Plus Fe³ (1%) | 35.6 |

Again it should be observed that the phenol coefficient actually increases in the presence of contaminating metal ions.

According to current studies, the increase in biocidal activity in the presence of contaminating metal ions probably occurs through the formation of a chelate with divalent metals containing two moles of a quaternary per molecule, and with trivalent metals, containing three moles per molecule, according to the following proposed structure:

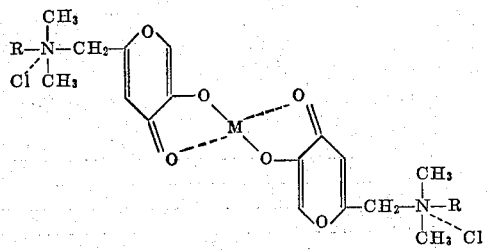

EXAMPLE 2

Chlorokojic acid was dissolved in stearyl dimethyl tertiary amine (DM18D of the Armour Company), refluxed, and the resulting quaternary ammonium compound separated as in Example 1. This active compound has the following structure:

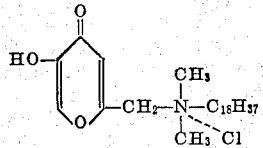

EXAMPLE 3

Chlorokojic acid was dissolved in cetyl dimethyl tertiary amine (DM16D of the Armour Company), refluxed and separated to give the following active quaternary ammonium compound:

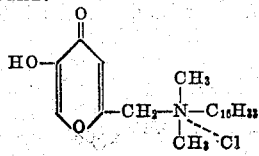

EXAMPLE 4

The 6-hydroxymethyl gamma pyrone analogous to chlorokojic acid is dissolved in dimethyl tertiary amine, refluxed and separated to give biocidally active compounds as follows:

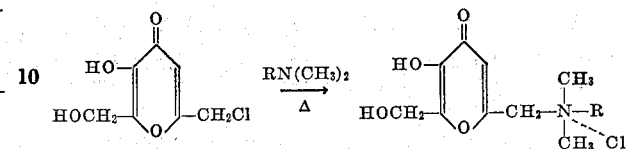

EXAMPLE 5

The following compounds have been similarly prepared and found to be active:

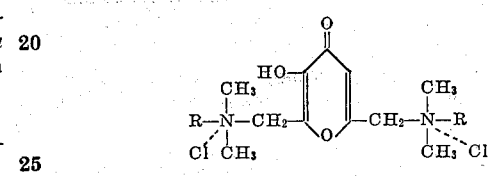

EXAMPLE 6

Kojic acid is converted to the analogous gamma pyridone, refluxed with the dimethyl tertiary amines to give the following active compounds:

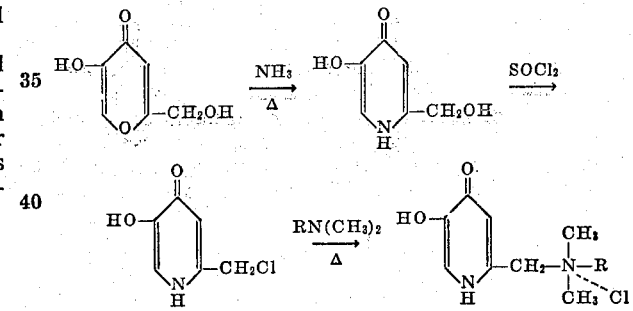

EXAMPLE 7

2,2'-dichloromethyl 6,6'-dikojyl methane was prepared from kojic acid and converted to active quaternary compounds as follows:

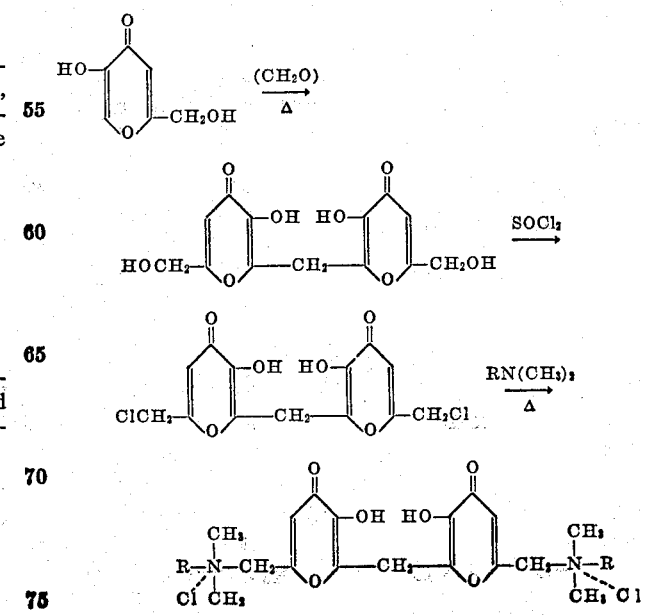

EXAMPLE 8

The following compounds were similarly prepared and found to be biocidally active:

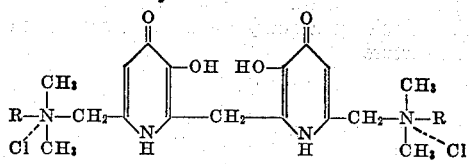

Each of the quaternary ammonium compounds shown in Examples 2 through 8 have been tested according to procedures similar to those shown in Example 1 and found to have similar fungicidal and bactericidal properties. In each of these examples the useful tertiary amines are the same as those shown in Example 1, that is, a tertiary amine having an aliphatic hydrocarbon (R) with between 8 and 18 carbon atoms and preferably an even number of carbon atoms with not more than two double bonds. While the biocidally active quaternary compounds can be prepared from pure amines as shown in Examples 2 and 3 above, it is well-known that mixtures of tertiary amines yielding a mixture of quaternary compounds such as shown in Example 1 yield a more active material. Dimethyl tertiary amines have been shown in the examples as the cheapest and most readily available material. However other tertiary amines such as for example the homologs methyl-ethyl or diethyl, etc. can be employed. Similarly, while the chlorine derivative of kojic acid is shown as the most convenient starting material, the other halides can be used. While it is preferred that the anion present with the quaternary ammonium compound be a halide or sulfate, any inert anion can be employed. For example, in all of the foregoing steps wherein the chlorine derivative of the kojic acid type molecule was formed with thionyl chloride (SOCl₂), the bromine derivative (and hence the bromine quaternary salt) can be formed by substituting for the thionyl chloride a mixture of bromine in glacial acetic acid. These bromine derivatives are much more reactive with the amines than the corresponding chlorine materials and form the quaternary salt in a much shorter time and at a lower temperature.

The metal ions which form biocidally active complexes with the quaternary compounds of this invention include the alkali metals, calcium, magnesium, iron (ferric and ferrous), cobalt (cobaltic and cobaltous), manganese (manganous) and copper. These complexes are water soluble and can readily be prepared by adding soluble salts of these metals to water solutions of the quaternaries, followed by drying if desired.

It should be noted that all of the quaternary ammonium compounds shown herein have a similar ring structure capable of forming chelates or complexes with metal ions and consequently are not deactivated in the presence of such ions. These active quaternary ammonium compounds can be used as fungus and bacteria disinfectants by mixing with carriers such as water, dry inert powders, creams, and the like for application to plants and inanimate objects. These compounds have been found to make very desirable materials for embalming purposes.

It should be understood that this disclosure is for the purpose of illustration only and that the invention includes all modifications falling within the scope of the appended claims.

I claim:

1. A cationic quaternary ammonium compound selected from the group consisting of

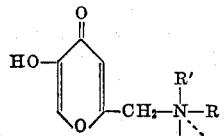 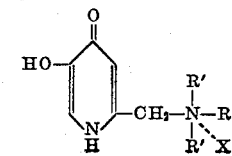 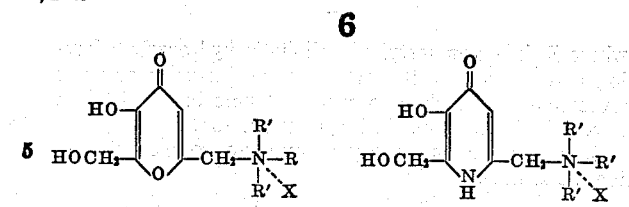

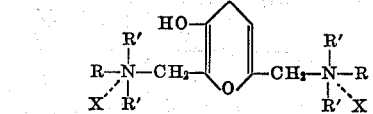

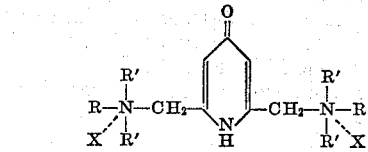

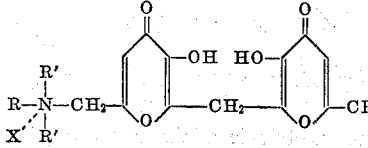

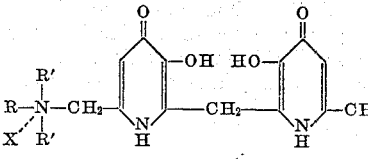

and metal chelates thereof, where R is a non-acetylenic aliphatic hydrocarbon having between 8 and 18 carbon atoms inclusive and not more than two carbon to carbon double bonds, R' is a lower alkyl group and X is an inert anion.

2. The method of suppressing fungus and bacteria on plants and inanimate objects which comprises bringing in contact therewith as active ingredient a quaternary compound according to claim 1.

3. A cationic quaternary ammonium compound having the structure

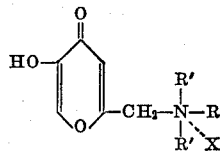

where R is a non-acetylenic aliphatic hydrocarbon having between 8 and 18 carbon atoms inclusive and not more than two carbon to carbon double bonds, R' is a lower alkyl group and X is an inert anion.

4. A cationic quaternary ammonium compound having the structure

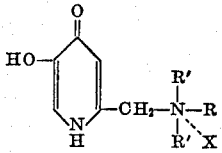

where R is a non-acetylenic aliphatic hydrocarbon having between 8 and 18 carbon atoms inclusive and not more than two carbon to carbon double bonds, R' is a lower alkyl group and X is an inert anion.

5. A cationic quaternary ammonium compound having the structure

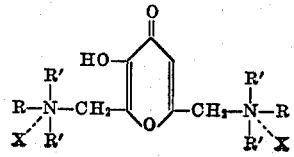

where R is a non-acetylenic aliphatic hydrocarbon having between 8 and 18 carbon atoms inclusive and not more than two carbon to carbon double bonds, R' is a lower alkyl group and X is an inert anion.

6. A cationic quaternary ammonium compound having the structure

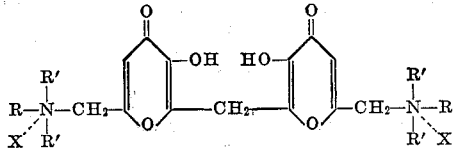

where R is a non-acetylenic aliphatic hydrocarbon having between 8 and 18 carbons atoms inclusive and not more than two carbon to carbon double bonds, R' is a lower alkyl group and X is an inert anion.

7. A cationic quaternary ammonium compound having the structure

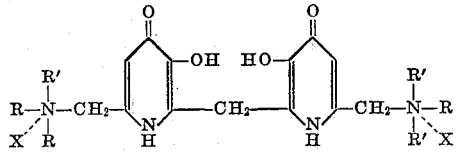

where R is a non-acetylenic aliphatic hydrocarbon having between 8 and 18 carbon atoms inclusive and not more than two carbon to carbon double bonds, R' is a lower alkyl group and X is an inert anion.

8. A cationic quaternary ammonium compound having the structure

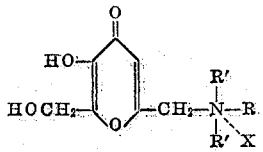

where R is a non-acetylenic aliphatic hydrocarbon having between 8 and 18 carbon atoms inclusive and not more than two carbon to carbon double bonds, R' is a lower alkyl group and X is an inert anion.

9. A cationic quaternary ammonium compound having the structure

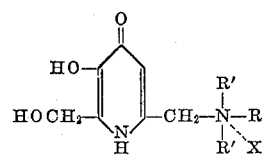

where R is a non-acetylenic aliphatic hydrocarbon having between 8 and 18 carbon atoms inclusive and not more than two carbon to carbon double bonds, R' is a lower alkyl group and X is an inert anion.

10. A cationic quaternary ammonium compound having the structure

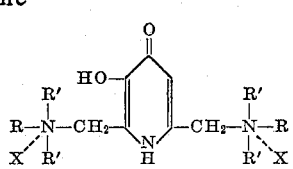

where R is a non-acetylenic aliphatic hydrocarbon having between 8 and 18 carbon atoms inclusive and not more than two carbon to carbon double bonds, R' is a lower alkyl group and X is an inert anion.

References Cited in the file of this patent

Wolf et al.: Chem. Abstracts, vol. 45, col. 10298 (1951).
Fitzgerald et al.: Chem. Abstracts, vol. 47, col. 10055–6 (1953).
Woods: J. Am. Chem. Soc., vol. 77, pp. 1702–3 (1955).